United States Patent
Matley

(10) Patent No.: US 7,568,313 B1
(45) Date of Patent: Aug. 4, 2009

(54) SUSPENDED CEILING PROJECTOR MOUNT APPARATUS

(76) Inventor: William T. Matley, 5988 Lohr, Ann Arbor, MI (US) 48108-5907

( * ) Notice: Subject to any disclaimer, the term of this patent is extended or adjusted under 35 U.S.C. 154(b) by 458 days.

(21) Appl. No.: 10/876,978

(22) Filed: Jun. 25, 2004

Related U.S. Application Data

(60) Provisional application No. 60/484,701, filed on Jul. 3, 2003.

(51) Int. Cl.
*G09F 7/18* (2006.01)

(52) U.S. Cl. .......................... 52/39; 52/506.6; 248/317; 248/343

(58) Field of Classification Search .............. 52/39, 52/506.06, 220.6, 220.8, 243.1; 362/404, 362/147, 148; 248/317, 327, 333, 343; 439/215, 439/537; 174/491
See application file for complete search history.

(56) References Cited

U.S. PATENT DOCUMENTS

| | | | | |
|---|---|---|---|---|
| 2,778,085 A | * | 1/1957 | Bernard ........................ 24/268 |
| 3,590,135 A | * | 6/1971 | Herbenar et al. ............. 174/491 |
| 3,846,604 A | * | 11/1974 | Shallbetter ................... 200/297 |
| 3,856,981 A | * | 12/1974 | Boundy ........................ 174/491 |
| 3,931,452 A | * | 1/1976 | Nilsson ........................ 174/491 |
| 4,278,834 A | * | 7/1981 | Boundy ........................ 174/497 |
| 4,293,895 A | * | 10/1981 | Kristofek ...................... 362/147 |
| 4,366,866 A | * | 1/1983 | Sweeney ....................... 169/37 |
| 4,438,613 A | * | 3/1984 | Hintsa et al. ................ 52/506.9 |
| 4,686,381 A | * | 8/1987 | Boteler et al. ................ 307/147 |
| 4,727,587 A | * | 2/1988 | Black ........................... 381/395 |
| 4,738,054 A | * | 4/1988 | Muth et al. ..................... 49/386 |
| 4,748,900 A | * | 6/1988 | Swin et al. .................... 454/295 |
| 4,872,512 A | * | 10/1989 | Multer .......................... 169/51 |
| 5,206,464 A | * | 4/1993 | Lamm et al. ................. 181/150 |
| 5,535,566 A | * | 7/1996 | Wilson et al. ............. 52/506.07 |
| 5,551,658 A | * | 9/1996 | Dittmer ........................ 248/329 |
| 5,911,661 A | * | 6/1999 | Murray et al. .............. 52/220.6 |
| 6,531,656 B1 | * | 3/2003 | Grote et al. ................... 174/491 |
| 6,571,519 B1 | * | 6/2003 | Diffrient et al. ................ 52/239 |
| 6,598,846 B1 | * | 7/2003 | Lackey, Jr. ................... 248/343 |
| 6,709,238 B2 | * | 3/2004 | Marshall .................. 416/210 R |
| 6,752,218 B2 | * | 6/2004 | MacDonald et al. ........... 169/43 |

* cited by examiner

*Primary Examiner*—Korie H. Chan
(74) *Attorney, Agent, or Firm*—Young Basile, PC

(57) ABSTRACT

A ceiling mount apparatus including a mounting board mountable in a drop ceiling grid, a mounting support with a first end threadingly engaging a ceiling mount plate on a projector. A second end of the mounting support is fixedly mounted on the mounting board by a clamp. One end of a safety strap is attached to a fixed ceiling member and another end is attached to a fastener of the apparatus to prevent inadvertent dislodgement of the mounting board from the ceiling grid. A safety pin extends through diametrically opposed apertures on the second end of the mounting support to prevent the support member from inadvertently dislodging from the mounting board. The mounting board also includes a pre-mounted electrical outlet possessing a predetermined length of electrical cord.

14 Claims, 3 Drawing Sheets

SUSPENDED CEILING PROJECTOR MOUNT APPARATUS

CROSS REFERENCE

This application claims the benefit of the Jul. 3, 2003 filing date of U.S. Provisional Application 60/484,701, the contents of which are hereby incorporated entirely.

BACKGROUND

The present invention relates, in general, to ceiling mounted supports and, more particularly, to ceiling mounted supports for projectors.

In educational settings, it is common to mount projectors, such as LCD projectors, on the ceiling to provide clear, unimpeded visual displays and to avoid disrupting classroom seating.

Heretofore, projector ceiling mounting apparatus has been an on site mounting task wherein a variety of apparatus are employed to mount the projector to the ceiling. Such apparatus frequently make use of a mounting bracket with an aperture which is available from the projector manufacturer.

Ceiling mounting of projectors is further complicated by the common use of suspended drop ceilings wherein relatively thin acoustic panels are removably suspended in a grid mounted to the overhead ceiling studs. Such ceilings require special mounting provisions to accommodate the thin, weak acoustic panels employed in such ceilings.

Thus, it would be desirable to provide a drop ceiling projector mounting apparatus which simplifies the task of mounting a projector mount in a drop or suspended ceiling.

SUMMARY

The present invention is a ceiling mount apparatus including a mounting board formed of a rigid material mountable in a drop ceiling grid, a mounting support, and a projector.

The mounting support of the apparatus includes first and second ends. The first end threadingly engages a projection ceiling mount plate affixed to the projector housing. The second end may be threaded or smooth. The second end extends through an aperture in the mounting board to fix the mounting support to the mounting board by means of a clamp.

The ceiling mount apparatus also includes a support member being attached to an inner surface of the mounting board. The support member includes an aperture that is coaxially aligned with an aperture in the mounting board.

The ceiling mount apparatus also includes optional safety features, such features including a safety strap where one end of the strap is secured to a fixed ceiling member, i.e. ceiling stud, etc., and the other end is affixed to a fastening means of the apparatus. This optional safety strap is used to prevent inadvertent dislodgement of the mounting board from the ceiling grid.

Another safety feature of the ceiling mount apparatus is a safety pin that extends through diametrically opposed apertures on the second end of the mounting support. The safety pin feature prevents the support member of the apparatus from inadvertently dislodging from the mounting board.

Another optional feature of the ceiling mount apparatus is to include an electrical outlet on the mounting board. Additionally, a predetermined length electrical cord can optionally be pre-wired to the electrical outlet.

Furthermore, optional audiovisual features can be included on the mounting apparatus; such features include but are not limited to speakers, etc.

The ceiling mount apparatus of the present invention provides a drop ceiling projector mounting apparatus which simplifies the task of mounting a projector mount in a drop or suspended ceiling.

BRIEF DESCRIPTION OF THE DRAWINGS

The various features, advantages and other uses of the present invention will become more apparent by referring to the following detailed description and drawing in which.

DETAILED DESCRIPTION

Figure 1:
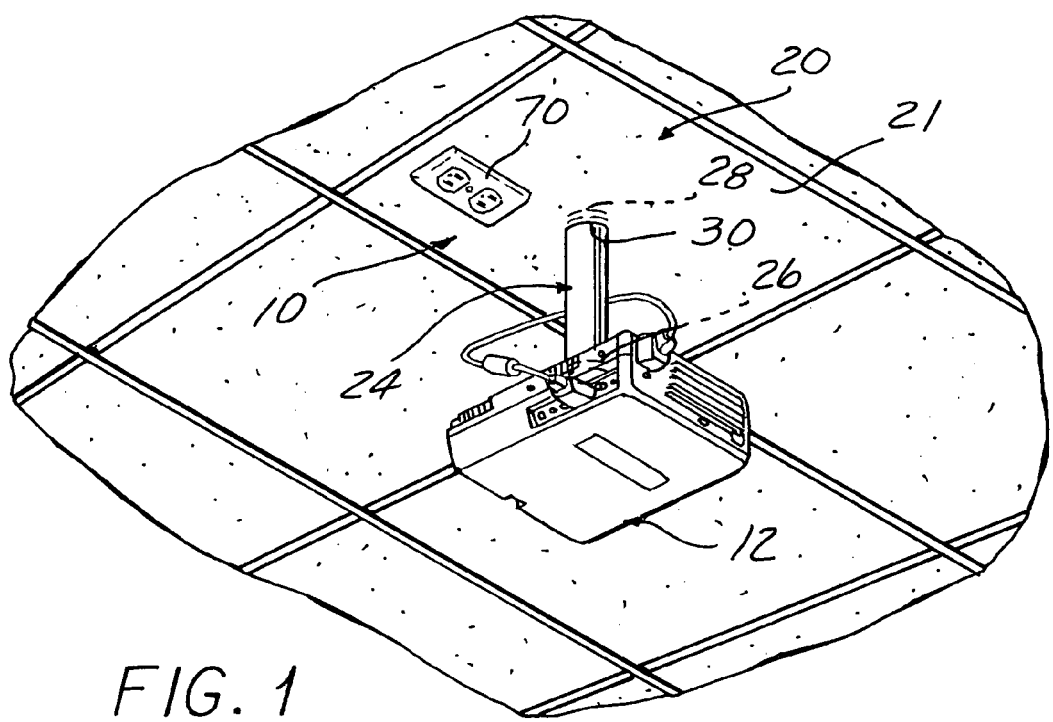
FIG. 1 is a perspective view of a ceiling mount apparatus according to the present invention, depicted mounted in a drop ceiling.

Referring now to the drawings, and to FIGS. 1-4 in particular, there is depicted a ceiling mount apparatus suitable for mounting projectors or other audio/visual equipment on a ceiling and, preferably in a drop or suspended ceiling.

Figure 2:
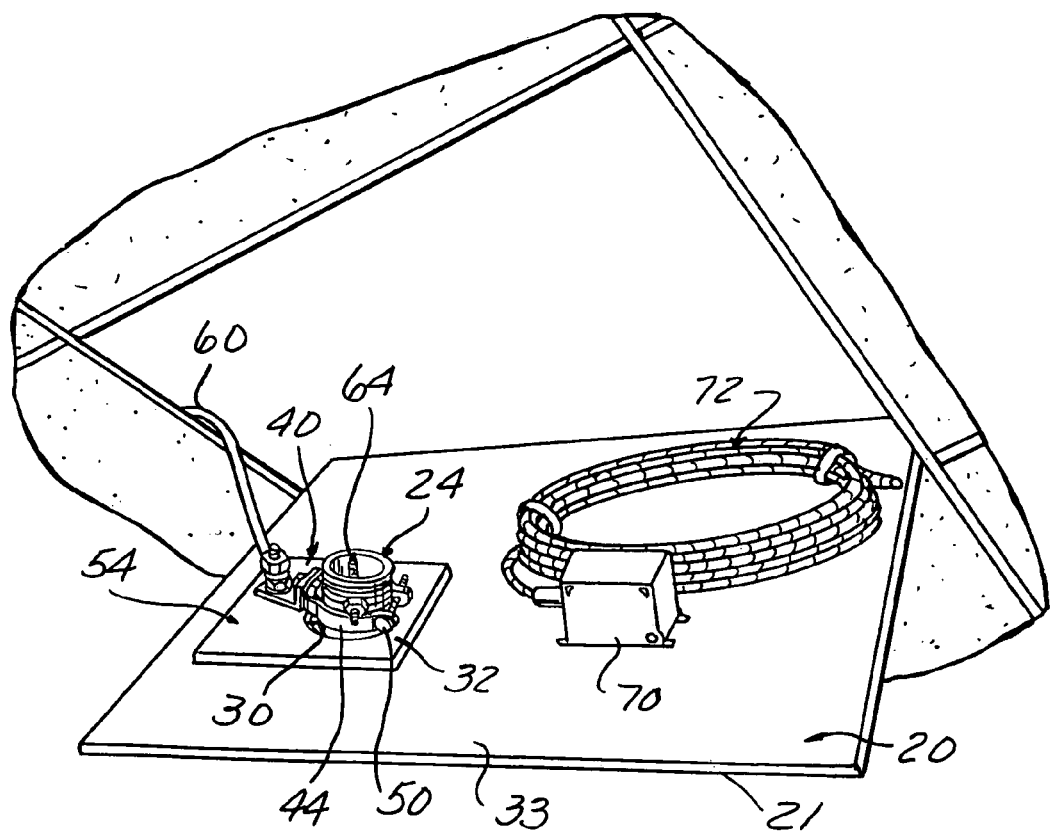
FIG. 2 is a perspective view showing the upper surface of the ceiling mount apparatus depicted in a partially installed position in a drop ceiling.
Figure 3:
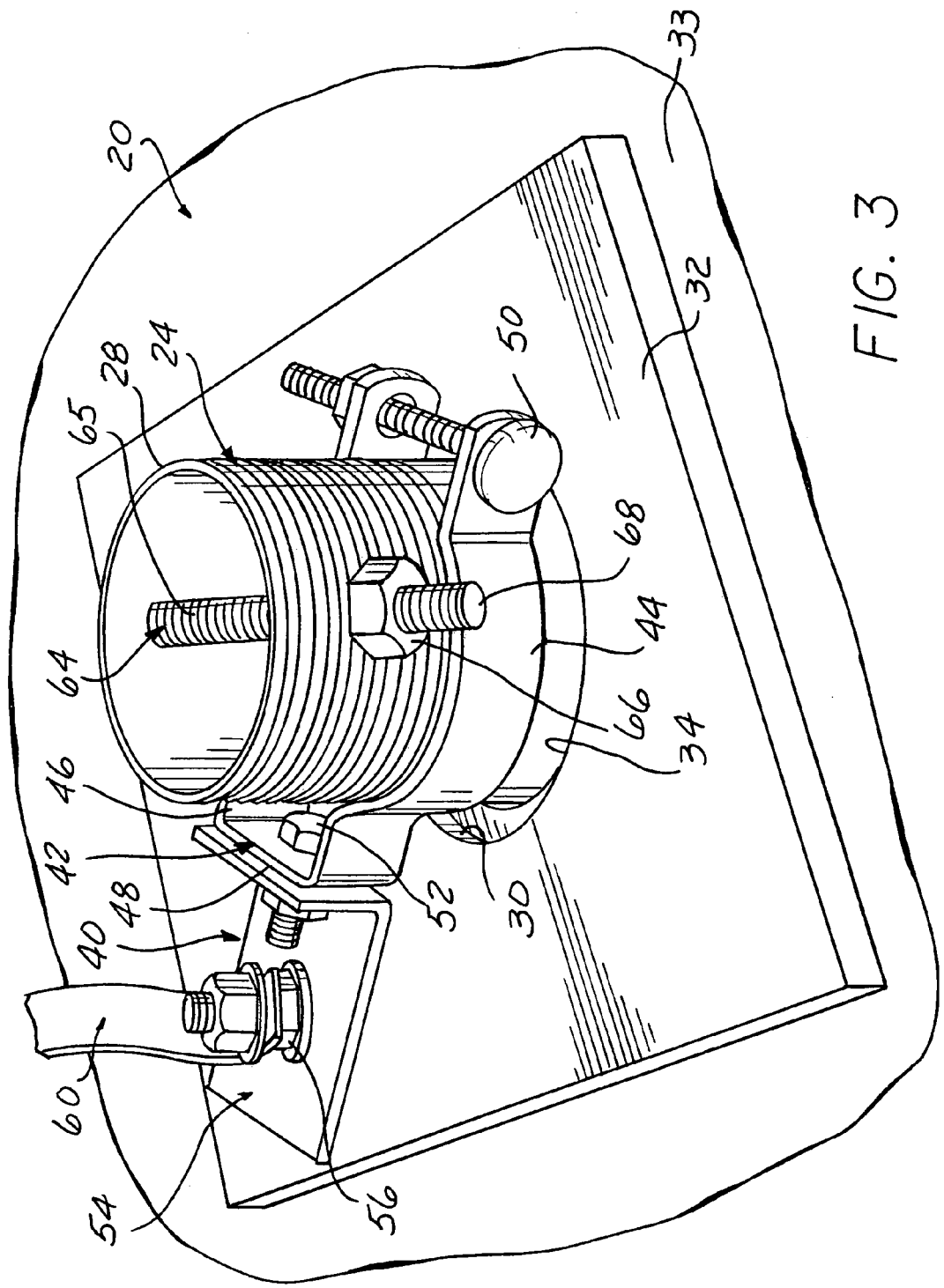
FIG. 3 is a partial, perspective view showing the pipe clamp according to the present invention.

The apparatus 10 includes a mounting board or panel 20 which is sized to fit within a 2'×2' standard drop ceiling grid opening as shown in FIGS. 2 and 3. If the grid opening is 4'×2', the existing ceiling panel, as described in the installation manual procedures hereafter, can be cut to 2'×2' and a center divider strip added to the ceiling grid before the mounting board 20 can be installed in the ceiling grid.

Alternately, a 2'×4' mounting board can be made for direct installation in the grid opening.

The mounting board 20 is formed of a suitable, rigid material having sufficient strength to support approximately twenty pounds; although higher article support weights are also possible. For example, the mounting board 20 can be formed of melamine covered particle board having white exterior surfaces.

A mounting support 24 in the form of a hollow metal pipe, formed of steel or other suitable strong material, is fixedly mounted on the mounting board 20 such that a threaded first end 26 in FIG. 1 extends a short distance below what will be the exposed surface of the mounting board 20. The external threads on the end 26 are adapted to threadingly engage a standard projector ceiling mount plate, not shown in FIG. 1, which is mountable on the projector 12 by means of fasteners. The shape of the mounting plate will vary from projector manufacturer to projector manufacturer and is not shown in FIG. 1 due its common availability.

The opposite or second end 28 of the mounting support or pipe 24 may be threaded or alternatively, can have a smooth exterior. The mounting support or pipe 24 extends through an aperture 30 in the mounting board 20. The second end 28 of the mounting support or pipe 24 projects the short distance above the surface 33 of the mounting board 20 which is normally disposed within the ceiling grid and covered from view. A support member or plate 32 is glued or otherwise fastened, such as by nailing, to the surface 33 of the mounting board 20 and has an aperture 34 slightly larger than the aperture 30 in the mounting board 20. The aperture 34 is coaxially aligned with the aperture 30.

The mounting support or pipe 24 is affixed to the mounting board 20 by means of a clamp means 40 shown in FIG. 3. The clamp means 40 includes a generally U-shaped saddle 42 formed of a first leg 44, opposed second leg 46 and a central leg 48 spanning and interconnecting one end of side legs 44 and 46. The opposed spaced ends of each of the side legs 44 and 46 are generally aligned and at a smaller spacing from the opposed portions of the opposite side leg then an enlarged diameter center section which snugly conforms to the outer diameter of the pipe 24. A bolt 50 is mountable through aligned apertures in one end of the side legs 44 and 46. A nut is used on the bolt 50 to tighten the side legs 44 and 46 securely about the outer diameter of the pipe 24.

The central leg 46 is secured, such as by a nut and bolt 52, to one leg of an angle bracket 54. The other leg of the angle bracket 54 is fixed to the support plate 32, also by means of a nut and bolt 56, by example only. The angle bracket 54 supports the U-shaped clamp 42 on a support plate 32. As shown in FIG. 3, one edge of the opposite ends of the side legs 44 and 46 of the clamp 42 rest on one surface of the support plate 32. The support plate 32 distributes the weight of the pipe 24 and the clamp means 40 over a large surface.

As shown in FIGS. 2 and 3, an optional safety strap means 60 has at least one and preferably both ends secured to the fastener 56 used to attach the angle bracket 54 to the support plate 32. The other end of the strap means 60 is wrapped around or can be tied to a fixed ceiling located member, such as a ceiling stud, truss, or an electrical or water pipe, or an HVAC duct, as explained in step eight in the installation manual which forms part of this specification. The safety strap means 60 provides an added securement capability in case the mounting board 20 accidentally becomes dislodged from the ceiling grid by preventing the mounting board 20 from completing separating from the grid and falling toward the floor.

Another safety feature is provided by an optional safety pin 64 shown in detail in FIG. 3. The safety pin 64 extends through aligned, diametrically opposed apertures in the second end 28 of the pipe 24. A nut 66 secures the safety pin 64, which can be a bolt, 65, in position, with one end 68 of the safety pin 64 projecting outwardly beyond the inner diameter of the aperture 34 in the support plate 32. The safety pin 64 will engage the side legs 44 and 46 of the clamp 40 if the pipe 24 inadvertently moves from its fixed position in the clamp 40 in a downward direction through the mounting board 20. The safety pin 64, in combination with the strap means 60, insures that the projector 12 carried on the end of the pipe 24 does not fall away from the mounting board 20.

As shown in FIGS. 1 and 2, another optional feature of the ceiling mount apparatus is an electrical outlet 70 which is premounted on the upper surface 33 of the mounting board 20. Further optionally, the outlet 70 may be provided with a predetermined length, such as 25 feet, by example only, of an electrical cord 72. By example, the cord 72 is a twelve gauge, three-wire, metal shielded cable. With the socket portion of the electrical outlet 70 exposed through a face plate on the lower exposed surface 21 of the mounting board 20, as shown in FIGS. 1 and 2, the power cord 72 from the projector 12 may be easily connected to the outlet 70 to receive electrical power.

Installation of the ceiling mounting apparatus of the present invention is extremely easy. Since all of the elements, including any optional elements, are premounted on the mounting board 20, once the safety strap 60 is attached to ceiling support member, the mounting board 20 can be inserted through the opening in the ceiling grid and then dropped into engagement with the ceiling grid members. The electrical conductor 72 may then be attached to electrical power within the ceiling.

Figure 4:
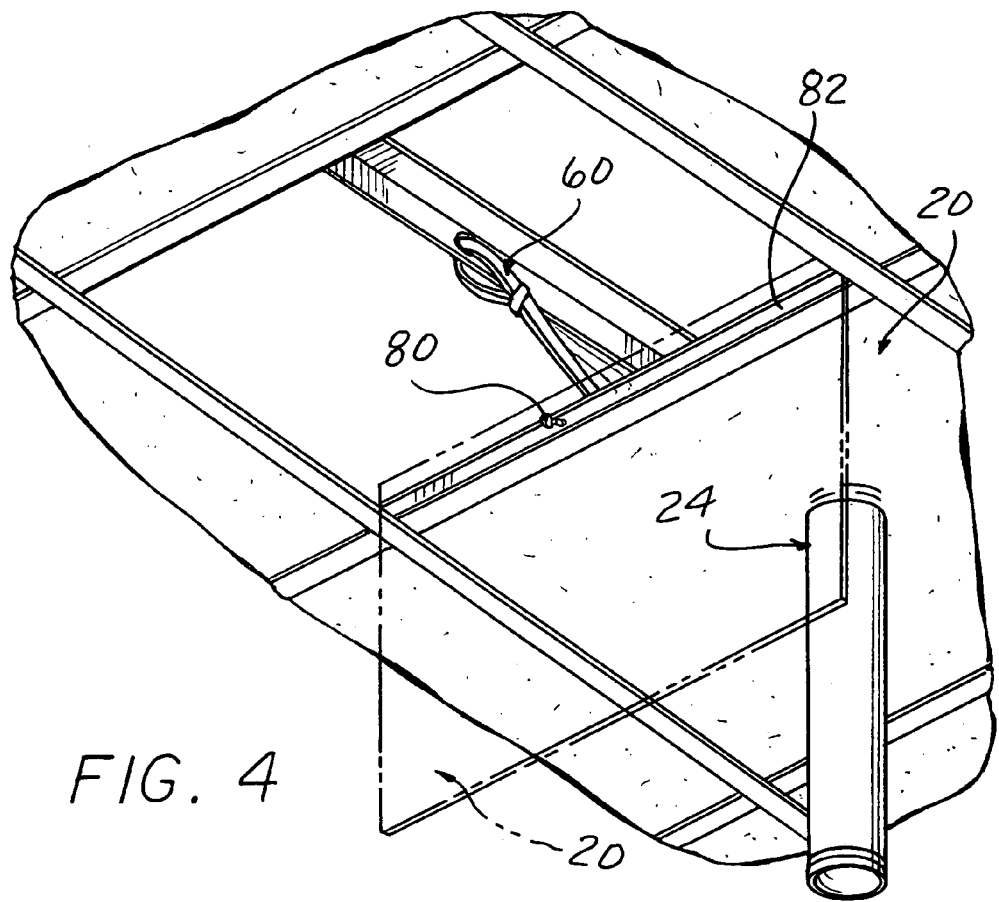
FIG. 4 is a perspective view showing the installation of the optional safety stop screws according to the present invention.

Another optional safety feature of the present invention is shown in FIG. 4 and includes at least one and preferably a plurality, with four being provided by way of example only, of mounting screws 80 which are threaded through the grid members, preferably in the upright members 82 into the mounting board 20 of the drop ceiling grid, and more on each side edge of the mounting board 20. Engagement of the screws 80 through the upright grid support members 82 and the mounting board 20 fixes the mounting board 20 in place and prevents any inadvertent movement or disengagement of the mounting board 20 from the ceiling grid.

Figure 5:
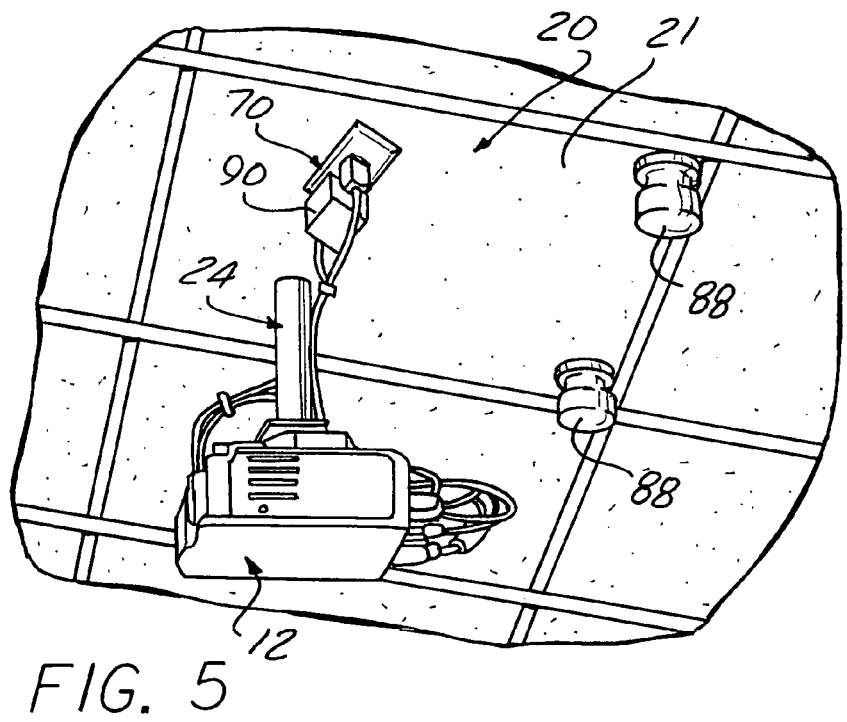
FIG. 5 is a perspective view showing additional optional features of the ceiling mount apparatus of the present invention.

Refer now to FIG. 5, several other optional features of the present ceiling mount apparatus 10 are also shown.

At least one and, preferably, a plurality, such as two or more, speakers 88 are mounted on the mounting board 20 and extend below the lower exposed surface 21 of the mounting board 20. Apertures formed in the mounting board 20 in line with the speakers 88 provide openings for passage of power conductors and audio cables from the projector 12 to each speaker 88. For example, the speakers 88 may be Mediaphile speakers which provide 360° sound dispersion.

Some speakers require DC power for operation. An AC/DC 12 volt power converter 90 is plugged into one of the sockets in the outlet 70 to convert the AC power provided by the outlet 70 to the low level DC power required for operation of the speakers 88. The low voltage power cord from the converter 90 can pass through an opening in the projector mounting plate and then through the tube 24, and above the mounting board 20 to the two connections at the speakers 88.

Other electrical networking or computer signal cables or conductors may also pass from a building computer network or nearby computer, through the ceiling down through the tube 24 to connections on the projector 12. This provides a clean, aesthetic appearance for such conductors and provides a measure of protection for the conductors or cables.

In conclusion, there has been disclosed an apparatus for mounting an audio/visual projector in a drop ceiling grid.

What is claimed is:

1. A ceiling mount apparatus for mounting projectors and other audio/visual equipment on a ceiling comprising:

a mounting board adapted for mounting on a ceiling said mounting board having a first planar side and an opposing second planar side;

a mounting support in the form of a tubular member having first and second ends, the tubular member carried on the mounting board for supporting a projector on the mounting board;

an aperture in the mounting board receiving the second end of the tubular member therethrough;

a support plate carried on only the first planar side of the mounting board, the support plate including an aperture coaxially aligned with an aperture in the mounting board through which the mounting support extends with a portion of the mounting support on both first and second planar sides of the mounting board;

clamp means positioned adjacent only the first planar side of the mounting board for clamping the member to the mounting board wherein the clamp means comprises:

a body having a first leg, an opposed, spaced second leg, said first and second legs each having free ends and a central end leg joining the first and second legs; and a bracket, the bracket fixed to the support plate and to the clamp means.

2. The ceiling mount apparatus of claim 1 wherein the clamp means further comprises:
   fastening means projecting through aligned apertures in the first and second legs for affixing the clamp means to the tubular member.

3. The ceiling mount apparatus of claim 2 wherein the aligned apertures are adjacent to the free ends of the first and second legs.

4. The ceiling mount apparatus of claim 1 further comprising:
   means for fixing the clamp means to the mounting board.

5. The ceiling mount apparatus of claim 1 further comprising:
   means, securable to a ceiling support and to the ceiling mount apparatus for preventing disengagement of the mounting board from the ceiling, wherein the means for preventing disengagement comprises:
   a strap means securable at one portion to the ceiling support and at another portion to the support plate.

6. The ceiling mount apparatus of claim 5 further comprising:
   fastener means, carried on the mounting board, for securing one portion of the strap means to the mounting board.

7. A ceiling mount apparatus for mounting projectors and other audio/visual equipment on a ceiling comprising:
   a mounting board having first and second planar side adapted for mounting in a ceiling;
   a mounting support means, carried on the mounting board, for supporting a projector on the mounting board, said mounting support means comprising a tubular member;
   clamp means positioned adjacent only on the first planar side of the mounting board for clamping the mounting support means to the mounting board wherein the tubular member further comprises a threaded first end for threading attachment to a projector and wherein the tubular member has a portion extending on the first and second sides of the mounting board and the clamp means extends on the first side of the mounting board, the clamp means including a body having a first leg, an opposed, spaced second leg, and a central end leg joining the first and second legs; and
   fastening means projecting through aligned apertures in the first and second legs for affixing the clamp means to the tubular member.

8. A ceiling mount apparatus for mounting projectors and other audio/visual equipment on a ceiling comprising:
   a mounting board having first and second opposing planar sides and adapted for mounting in a ceiling;
   a mounting support means, carried on the mounting board, configured with a portion extending from the second planar side of the mounting board for supporting a projector from the second planar side of the mounting board;
   a support plate carried only on the first planar side of the mounting board, the Support plate including an aperture coaxially aligned with an aperture on the mounting board through which the mounting support means extends with a portion of the mounting support means on both planar sides of the mounting board;
   clamp means for clamping the mounting support means to the mounting board, the clamp means seated on the support plate on the first planar side of the mounting board; and
   means for fixing, the clamp means to the mounting board wherein the means or fixing the clamp means is carried only on the first planar side of the mounting board, the fixing means including a bracket fixed to the support plate and to the clamp means.

9. A ceiling mount apparatus for mounting projectors and other audio/visual equipment on a ceiling comprising;
   a mounting board having first and second planar side adapted for mounting in a ceiling;
   a mounting support means, carried on the mounting board, for supporting a projector on the mounting board, said mounting support means comprising a member;
   clamp means positioned adjacent only the first planar side of the mounting board for clamping the mounting support means to the mounting board wherein the member further comprises a threaded first end for threading attaching to a projector and wherein the member has a portion extending on the first and second sides of the mounting board and the clamp means extends on the first side of the mounting board; and
   means, carried on the mounting support means, for preventing separation of the mounting support means from the mounting board, the separation preventing means including a pin laterally extending through the mounting support means, one end of the pin extending from the mounting support means for interference with the mounting board in the event of relative movement between the mounting support means and the mounting board the one end of the pin extending from the mounting support means for interference with the mounting board and one end of the pin having a threaded end, and a fastener engageable with the threaded end of the pin to fix the pin in the mounting support means.

10. A ceiling mount apparatus for mounting projectors and other audio/visual equipment on a ceiling comprising:
    a mounting board adapted for mounting in a ceiling;
    a mounting support means carried on the mounting board, for supporting a projector on the mounting board;
    means, carried on the mounting support means, for preventing separation of the mounting support means from the mounting board, the means for preventing separation including a pin laterally extending through the mounting support means, one end of the pin extending from the mounting support means for interference with the mounting board in the event of relative movement between the mounting support means and the mounting board; and
    the pin having a threaded end projecting exteriorly of the mounting support means, a fastener engagable with the threaded end of the pin to fix the pin on the mounting support means.

11. A ceiling mount apparatus for mounting projectors and other audio/visual equipment on a ceiling comprising:
    a mounting board having first and second planar side adapted for mounting in a ceiling;
    a mounting support means, carried on the mounting board, for supporting a projector on the mounting board, said mounting support means being a member;
    clamp means positioned adjacent only the first planar side of the mounting board for clamping the mounting support means to the mounting board; wherein the member further comprises a threaded first end for threading attaching to a projector and wherein the member has a portion extending on the first and second sides of the mounting board and the clamp means extends on the first side of the mounting board; and
    an electrical outlet carried on the mounting board.

12. The ceiling mount apparatus of claim 11 further comprising:

an electrical conductor electrically connected at one end to the outlet, the electrical conductor having a free electrically connectable end.

13. The ceiling mount apparatus of claim 11 wherein:

the electrical outlet has a socket portion, the socket portion exposed through the mounting board.

14. A ceiling mount apparatus for mounting projectors and other audio/visual equipment on a ceiling;

a mounting board having first and second opposing planar sides and adapted for mounting in a ceiling;

a mounting support means, carried on the mounting board, configured with a portion extending from the second planar side of the mounting board for supporting a projector from the second planar side of the mounting board;

a support plate carried only on the first planar side of the mounting board, the support plate including an aperture coaxially aligned with an aperture on the mounting board through which the mounting support means extends with apportion of the mounting support means on both planar sides of the mounting board; and means, carried on the mounting support means, for preventing separation of the mounting support means from the mounting board, the separation preventing means including a pin laterally extending through the mounting support means, one end of the pin extending from the mounting support means for interference with the mounting board in the event of relative movement between the mounting support means and the mounting board.

* * * * *